July 1, 1930. J. ALBANY 1,769,198
FLOWER HOLDER
Filed Aug. 7, 1929
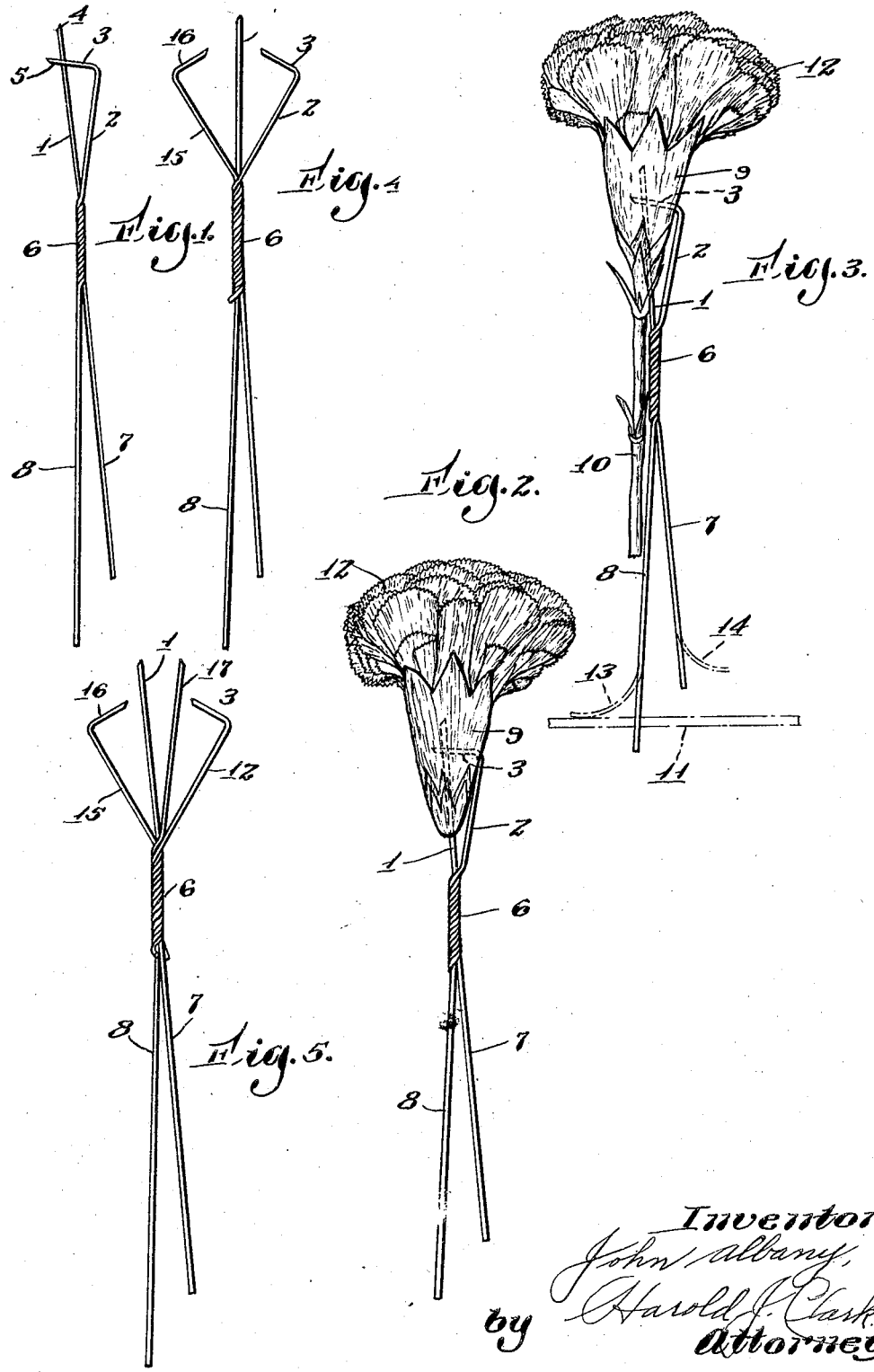

Patented July 1, 1930

1,769,198

UNITED STATES PATENT OFFICE

JOHN ALBANY, OF BOSTON, MASSACHUSETTS

FLOWER HOLDER

Application filed August 7, 1929. Serial No. 384,155.

My present invention relates to devices or holders for use in the support of flowers.

It is at present customary, when preparing flowers for use in wreaths, or the like, to provide a support for the flowers in said wreaths. The present practice is to insert a wire laterally through the calyx or base of a flower, then bend the wire, twist the projecting ends together, and stick the wires into the moss-filled frame or other base on which the flowers are being built up. There are several disadvantages to this method. In the first place, there is nothing to keep the flower from wabbling on the wire. In the second place, when bending the wire to twist the free ends together, the flower is frequently destroyed. In the third place, when attaching such support to a wreath base, or frame, the two wires penetrate the moss, but there is nothing to prevent the dropping or loosening of said wires from the frame.

An important object of the present invention is a provision of a flower holder or support which will hold the flower against wabbling, and which will also prevent longitudinal displacement of the flower from its support.

Another object of the invention resides in the provision of means to retain the flower and its support in the wreath or other device to which it has been attached.

A still further object of the invention resides in the provision of such a flower holder that will be simple and economical to manufacture, easy to attach or detach, and which will be extremely efficient and satisfactory to use.

Referring to the drawings, illustrating preferred embodiments of the present invention, Fig. 1 is a side elevation of the preferred form of the invention;

Fig. 2 is a side elevation of the holder applied to a flower with the stem of the flower removed;

Fig. 3 is a side elevation of the holder applied to a flower on which the stem remains, and also illustrating the manner in which the holder is retained within a wreath;

Fig. 4 is a side elevation of a modification; and

Fig. 5 is a perspective view of a still further modification.

Referring to the drawings or a particular description of the invention, its construction and operation, the preferred form comprises a vertically extending stem 1, a second stem 2 extending upwardly at an angle to the stem 1, and having an arm 3 as illustrated. The stem 1 has a relatively sharp point 4, and the arm 2 has a relatively sharp point 5. The stems 1 and 2 may comprise the ends of two wires, which are twisted together as at 6, the lower ends of these wires, 7 and 8, being of varying lengths, as clearly illustrated. While I have shown twisting as the means of uniting the two elements, it will be appreciated that these may be united in any other desired manner, such as by welding, soldering, or the like, or the device may be composed of a single wire or rod, split downwardly from the top and upwardly from the bottom, to produce the stems 1 and 2 and the ends 7 and 8.

The device is preferably of flexible material, and in Fig. 2 I have illustrated the device in position on a flower 12, having a calyx 9. When attaching my novel holder, the steam 2 is bent away from the stem 1, thereupon the stem 1 is inserted through the bottom of the calyx and extends upwardly a considerable distance therethrough. Thereupon the stem 2 is bent or forced toward the stem 1, causing the arm 3 to extend laterally through the calyx 9.

It will be readily understood and appreciated that the stem 1 extending longitudinally through the calyx 9 will prevent wabbling of the flower 12 on said stem, and that the presence of the arm 3 laterally through the calyx will prevent longitudinal displacement of the flower from the stem 1.

The ends 7 and 8 are constructed of varying lengths. Thus, when applied to the frame 11, or other structure, filled with moss or the like, the end 8 will strike the frame first, causing said end to bend, as illustrated at 13 in Fig. 3. This bending of the end 8 will clinch the holder within said frame, and if a still further grip is desired, the flower holder may be forced still further into the frame, whereupon the end 7 will bend, as illustrated at 14, thus effecting a double gripping or clinching of the flower holder within its frame or support.

It will thus be seen that I have devised an extremely simple flower holder, and since I believe the same to be novel, I have claimed this holder in the present invention.

Fig. 3 illustrates the application of my novel holder to a flower 12 on which the stem 10 has been permitted to remain, as is sometimes desired.

In Fig. 4 I have illustrated a slight modification, wherein the stems 1 and 2 are utilized, but have added a second stem 15, having an arm 16, adapted to penetrate laterally through the calyx of a flower, in the same manner as the arm 3.

The device of Fig. 4 is also provided with the free ends 7 and 8 of varying lengths.

In Fig. 5 I have illustrated a still further modification, wherein I have added a second stem 17 adapted to penetrate longitudinally through the calyx 9, in the same manner as the stem 1.

It will be appreciated that the size, length, shape, and method of uniting the component elements of my novel device, may be varied within reasonably wide limits without departing from the spirit of the invention.

My invention is further described and defined in the form of claims as follows.

I claim:

1. In a flower holder, a prong adapted to penetrate longitudinally through the calyx of a flower, and a prong adapted to extend laterally through said calyx.

2. In a flower holder, a prong adapted to penetrate longitudinally through the calyx of a flower, an arm angularly positioned relative to said prong, and a prong on said arm adapted to penetrate laterally through said calyx.

3. In a flower holder, a prong adapted to penetrate longitudinally through the calyx of a flower, a flexible arm angularly positioned relative to said prong, and a prong on said flexible arm adapted to penetrate laterally through said calyx.

4. In a flower holder, a prong adapted to penetrate longitudinally through the calyx of a flower, a second prong adapted to extend laterally through said calyx, and a depending stem comprising a pair of flexible members of varying lengths, whereby, when inserted into a support, said members will bend and clinch within said support.

5. In a flower holder, means adapted to engage the calyx of a flower to prevent lateral or longitudinal movement thereof, and a depending stem comprising a pair of flexible members of varying lengths, whereby, when inserted into a support, said members will bend and clinch within said support.

6. In an individual flower holder, a prong adapted to penetrate longitudinally through the calyx of a flower, and means to hold the flower against movement in all directions relative to said prong.

7. In an individual flower holder, a prong adapted to penetrate longitudinally through the calyx of a flower, and means connected with said prong and also adapted to penetrate a portion of the flower to hold the latter against movement in all directions relative to said prong.

In testimony whereof, I have signed my name to this specification.

JOHN ALBANY.